(12) United States Patent  
Fournier et al.

(10) Patent No.: US 6,604,600 B2
(45) Date of Patent: Aug. 12, 2003

(54) METHOD FOR ASSEMBLING A VEHICLE

(75) Inventors: André Fournier, Sherbrooke (CA); Michel Lefebvre, Valcourt (CA)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 10/224,560

(22) Filed: Aug. 21, 2002

(65) Prior Publication Data

US 2002/0189884 A1 Dec. 19, 2002

Related U.S. Application Data

(62) Division of application No. 09/877,211, filed on Jun. 11, 2001.
(60) Provisional application No. 60/245,675, filed on Nov. 6, 2000.

(51) Int. Cl.[7] .............................. B60K 5/00; B62D 21/00
(52) U.S. Cl. ................ 180/299; 180/312; 280/124.109; 267/141.2
(58) Field of Search .......................... 267/141.2, 141.6, 267/141.3, 141.7; 29/897.2; 280/124.109, 784, 785, 788; 180/228, 291, 299, 312; 248/674, 637

(56) References Cited

U.S. PATENT DOCUMENTS

| | | | |
|---|---|---|---|
| 3,583,506 A | | 6/1971 | Preble |
| 3,583,507 A | | 6/1971 | Trautwein |
| 3,622,196 A | | 11/1971 | Sarra |
| 3,627,073 A | | 12/1971 | Grimm |
| 3,747,879 A | * | 7/1973 | Houk .......................... 248/609 |
| 3,981,373 A | | 9/1976 | Irvine |
| 4,204,581 A | | 5/1980 | Husted |
| 4,204,582 A | | 5/1980 | Van Soest |
| 4,372,417 A | * | 2/1983 | Yamamoto et al. .......... 180/215 |
| 4,373,602 A | * | 2/1983 | Tomita et al. ............... 180/227 |
| 4,502,560 A | | 3/1985 | Hisatomi |
| 4,530,491 A | * | 7/1985 | Bucksbee et al. ........... 267/141 |

(List continued on next page.)

FOREIGN PATENT DOCUMENTS

| | | | | |
|---|---|---|---|---|
| CA | 2251769 | | 8/1995 | |
| JP | 63076930 A | * | 4/1988 | ............. F16F/1/38 |

OTHER PUBLICATIONS

Magazine Article: Dirt Wheels/Jan. 1991.
Brochure of Yamaha Snow Scout: Motoneige Quebec, 1987, vol. 13, No. 1 (CA).

(List continued on next page.)

Primary Examiner—Paul N Dickson
Assistant Examiner—Laura B. Rosenberg
(74) Attorney, Agent, or Firm—Pillsbury Winthrop LLP

(57) ABSTRACT

An engine mount for a vehicle, such as a snowmobile, that can be used when space for the engine within a chassis is limited and which is easily accessed from the side of the chassis for assembly and repair. The engine mount can be attached to the bottom of an engine that is positioned within a chassis. The engine mount can include four hollow, cylindrical portions. Each cylindrical portion having an axis extending transverse to the longitudinal direction of the snowmobile chassis and receiving a damping mount. Fasteners can be inserted through the chassis to couple with the damping mounts and cylindrical portions in a direction that is transverse to the longitudinal direction of the chassis. The configuration of the damping mounts permits effective damping especially in a direction transverse to the direction of forward travel of the vehicle.

4 Claims, 14 Drawing Sheets

U.S. PATENT DOCUMENTS

| | | | |
|---|---|---|---|
| 4,613,006 A | | 9/1986 | Moss et al. |
| 4,633,964 A | | 1/1987 | Boyer et al. |
| 4,667,943 A | * | 5/1987 | Izumi et al. .............. 267/141.3 |
| 4,696,364 A | * | 9/1987 | Enoki et al. ................ 180/228 |
| 4,699,229 A | | 10/1987 | Hirose et al. |
| 4,848,503 A | | 7/1989 | Yasui et al. |
| 4,895,115 A | * | 1/1990 | Weber et al. ........... 123/195 A |
| 5,074,374 A | * | 12/1991 | Ohtake et al. .............. 180/312 |
| 5,078,230 A | * | 1/1992 | Hasuike ..................... 180/291 |
| 5,370,198 A | | 12/1994 | Karpik |
| 5,474,146 A | | 12/1995 | Yoshioka et al. |
| 5,564,517 A | | 10/1996 | Levasseur |
| 5,630,575 A | * | 5/1997 | Koyanagi et al. ........ 267/140.3 |
| 5,660,245 A | | 8/1997 | Marier et al. |
| 5,944,133 A | | 8/1999 | Eto |
| 6,053,272 A | * | 4/2000 | Koyanagi et al. ........... 180/299 |
| 6,108,907 A | * | 8/2000 | Anderson et al. .......... 29/897.2 |
| 6,234,263 B1 | | 5/2001 | Boivin et al. |

OTHER PUBLICATIONS

Brochure of Yamaha Snow Scout: Snowmobile Brochure Business, $3^{rd}$ Annual.

Magazine Supertrax/Jan. 1999.

Snow tech, Spring 1999, Article "Special Report" Redline Snowmobiles, pp. 28–31.

Montoneige Quebec, vol. 25–No. 3, Nov. 1999, pp. 1 (front cover), 6, 31 and 58.

Creations J.P.L. Inc. Advertisement (advertising seat designs).

* cited by examiner

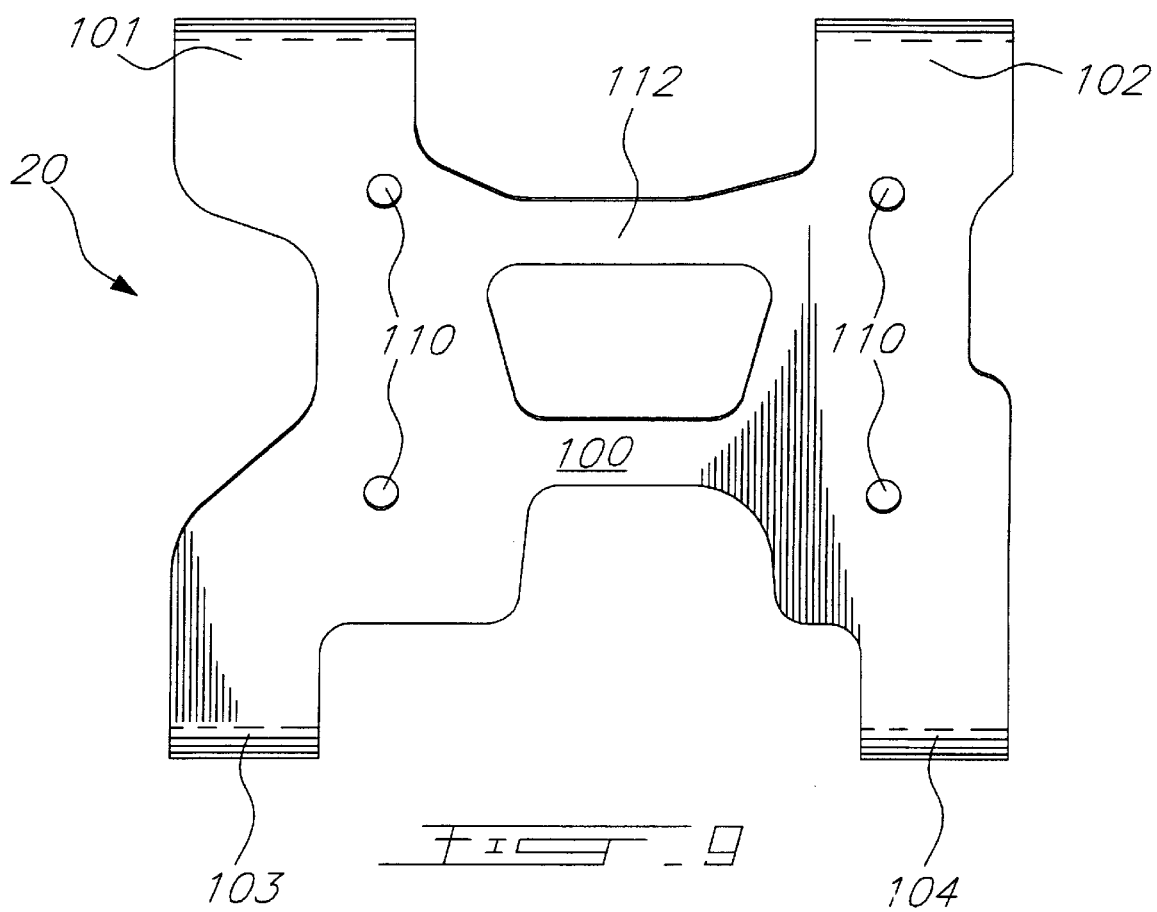

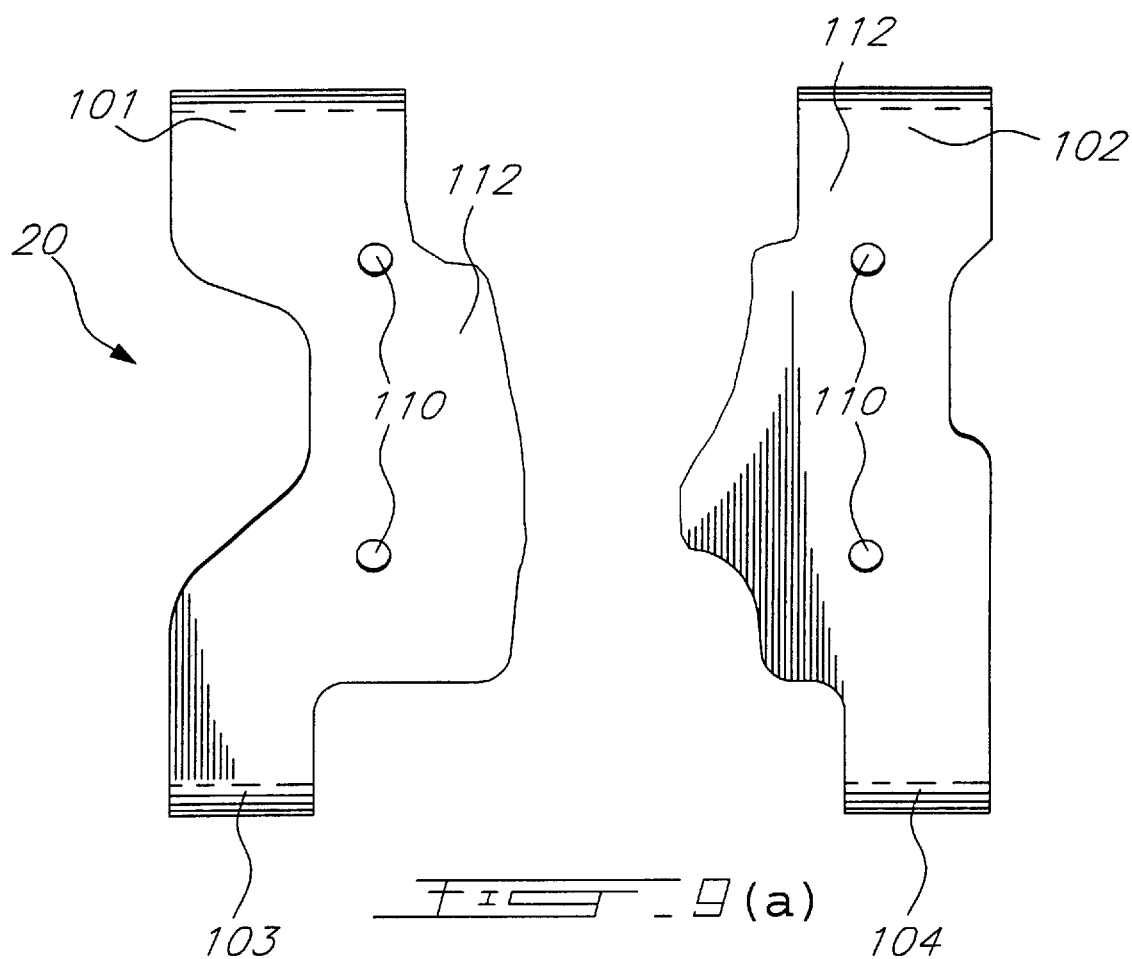

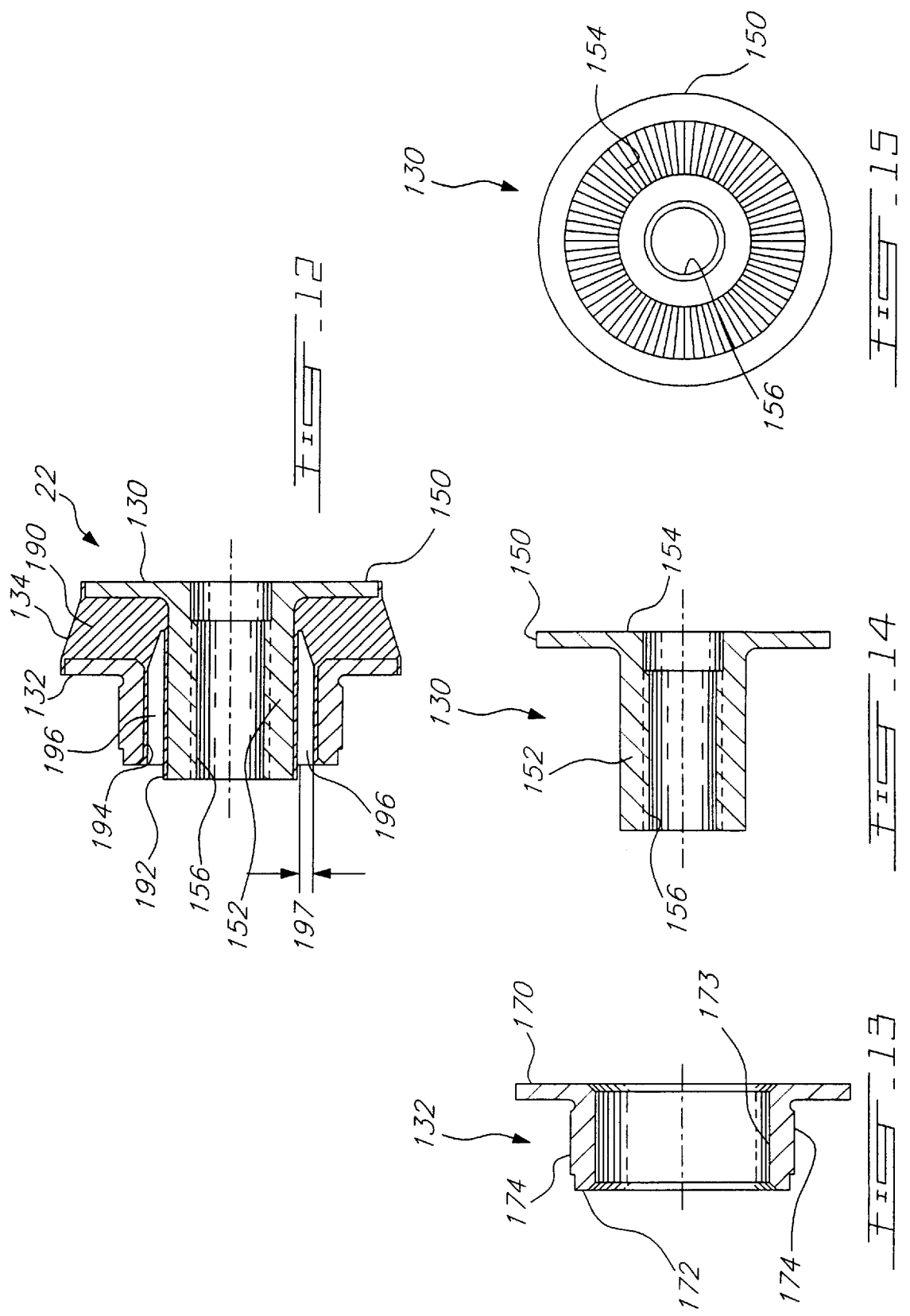

METHOD FOR ASSEMBLING A VEHICLE

CROSS REFERENCE TO RELATED APPLICATIONS

This is a Divisional of U.S. application Ser. No. 09/877,211 filed on Jun. 11, 2001, the contents of which are incorporated herein by reference. This application claims the benefit of priority to U.S. Patent Application No. 60/245,675, filed Nov. 6, 2000, the contents of which are herein incorporated by reference. This application is also related to U.S. patent application Ser. No. 09/472,134 for a SNOWMOBILE, filed Dec. 23, 1999; to U.S. Patent Application No. 60/167,614 for a SNOWMOBILE, filed Nov. 26, 1999; and U.S. Patent Application No. 60/230,432 for a NOVEL THREE WHEEL VEHICLE, filed Sep. 6, 2000, the contents of each being incorporated herein by reference.

BACKGROUND OF THE INVENTION

1. Field of the Invention

The present invention relates generally to supporting elements within a vehicle. More specifically, the invention relates to a support for a vehicle engine.

2. Background of the Invention

Typically, a snowmobile is powered by a two-stroke engine, which can cause large amounts of vibration. In order to decrease the amount of vibration from the engine to the chassis, typically, such engines were supported by an engine mount attached to the bottom of the engine in a way that enabled bolts with position-adjustable dampers to be placed between the engine mount and the chassis. However, such conventional engine mounts required relatively large amounts of space within the chassis for the engine and to provide the space needed to position the adjustable dampers. Also, conventional engine mounts require more space in the chassis at the front and rear of the engine. Further, previous engine mount dampers were designed to work most effectively against movement of the engine in the direction of movement of the vehicle and in the direction of the height of the vehicle, which in some situations is not the preferred direction for accommodating and damping forces such movements generate.

Accordingly, there exists a need for a new engine mount that can be used in a vehicle, such as a snowmobile, where the chassis has less available space for both the engine and for such an new engine mount. There is also a need for an engine mount that can be more easily assembled and accessed during production and repair activities and that can effectively reduce movement in a direction lateral to the direction of travel.

SUMMARY OF THE INVENTION

An object of the invention is to provide an improved engine mount for a vehicle.

Another object of the invention is to provide a snowmobile having an engine mount that can be used when space is limited within a chassis for the engine and engine mount.

Yet another object of the invention is to provide an improved resilient, damping mount for an engine.

Yet a further object of the invention is to provide an engine mount for a vehicle that can be installed and access from the sides of the vehicle to simplify production on an assembly line.

These and other objects of the invention may be accomplished by providing a base plate for securing an engine to a chassis. The base plate can include a body portion for securing to the bottom of the engine and at least a pair of cylinders extending from the body portion. The cylinders can receive fasteners and damping members for securing the engine to the chassis in a secure, damped manner.

These and other objects of the invention may be further accomplished by providing a mounting element for mounting an engine to a chassis. The mounting element can include a threaded socket having a first flange, a shoulder washer having a second flange and a resilient material positioned between and coupled to the first and second flanges to provide a resilient connection between the chassis and the engine.

These and other objects of the invention may be further accomplished by providing a vehicle having a chassis and an engine secured to the chassis by an engine mount. The engine mount can have a base plate for securing an engine to a chassis. The base plate can include a body portion secured to the bottom of the engine and cylinders extending from the body portion. The cylinders can receive fasteners and damping members for securing the engine to the chassis in a secure, damped manner. The damping members can include a threaded socket having a first flange, a shoulder washer having a second flange and a resilient material positioned between and coupled to the first and second flanges to provide a resilient connection between the chassis and the engine.

These and other objects of the invention may be further accomplished by providing a method of assembling a vehicle that includes securing the base plate to the engine, positioning the engine and the attached base plate within in opening in the top of the chassis, and inserting a fastener through the side of the chassis and into the threaded socket of the damping member.

Other objects, advantages, and features of the invention will become apparent to those skilled in the art from the follow detailed description which, taken in conjunction with the annexed drawings, discloses preferred embodiments of the invention.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein:

FIG. 9 shows a top view of the engine mount of FIG. 1;

FIG. 9(a) shows a top view of another exemplary engine mount according to the invention;

FIG. 12 illustrates a cross-sectional view of the rubber mount shown in FIG. 11 along line 12—12, which is similar to the cross-section of the rubber mount illustrated in FIG. 4;

FIG. 13 illustrates a cross-sectional view of a shoulder washer of the rubber mount of FIG. 12 taken along line 12—12 of FIG. 11;

FIG. 14 illustrates a cross-sectional view of a threaded socket of the rubber mount of FIG. 12 taken along line 12—12 of FIG. 11; and FIG. 15 illustrates a front view the threaded socket of FIG. 14.

DETAILED DESCRIPTION OF EXEMPLARY EMBODIMENTS

Figure 1:
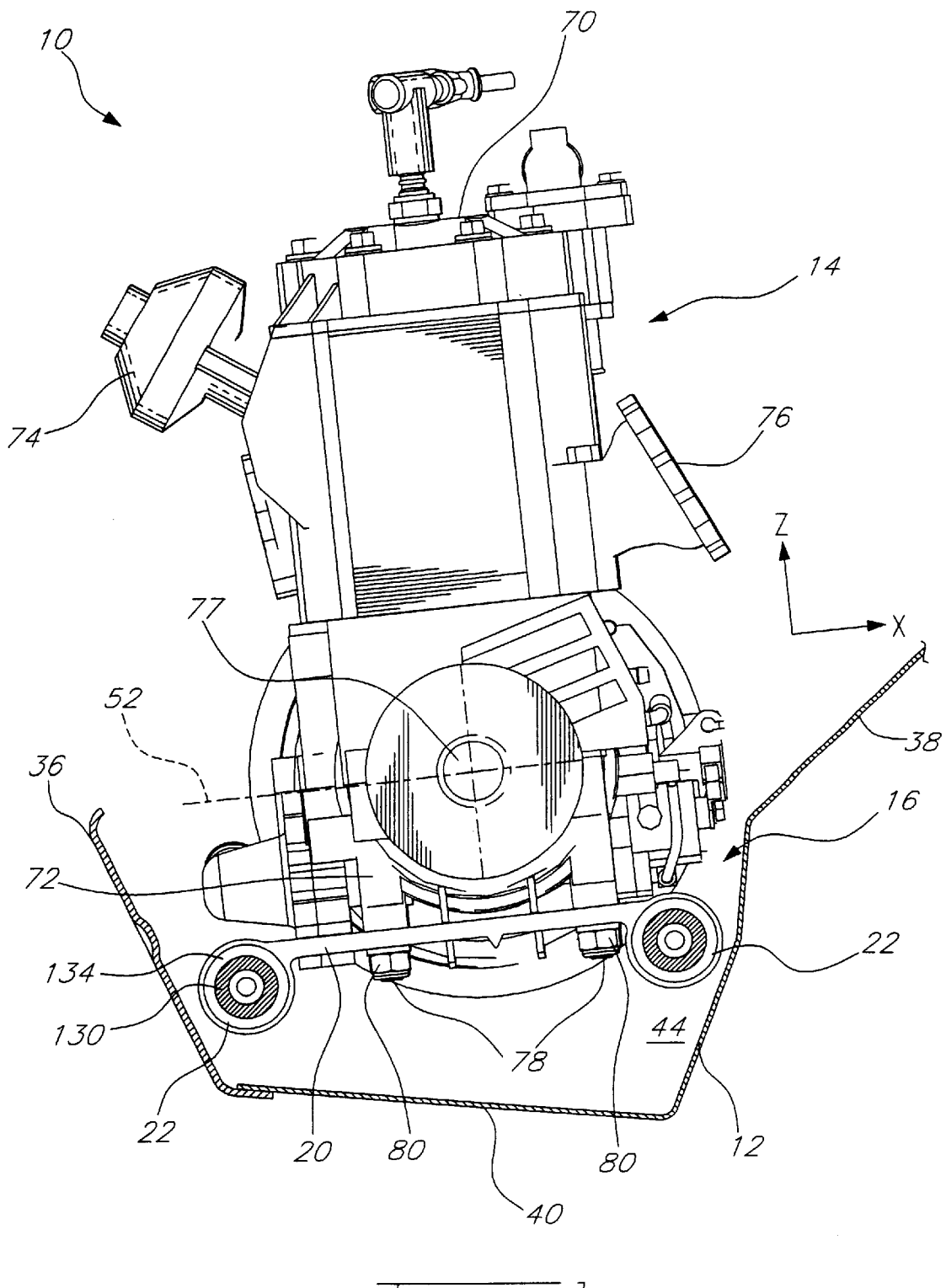
FIG. 1 illustrates a left side view of an engine mount in accordance with an embodiment of the invention attached to an engine and a chassis of a snowmobile.
Figure 2:
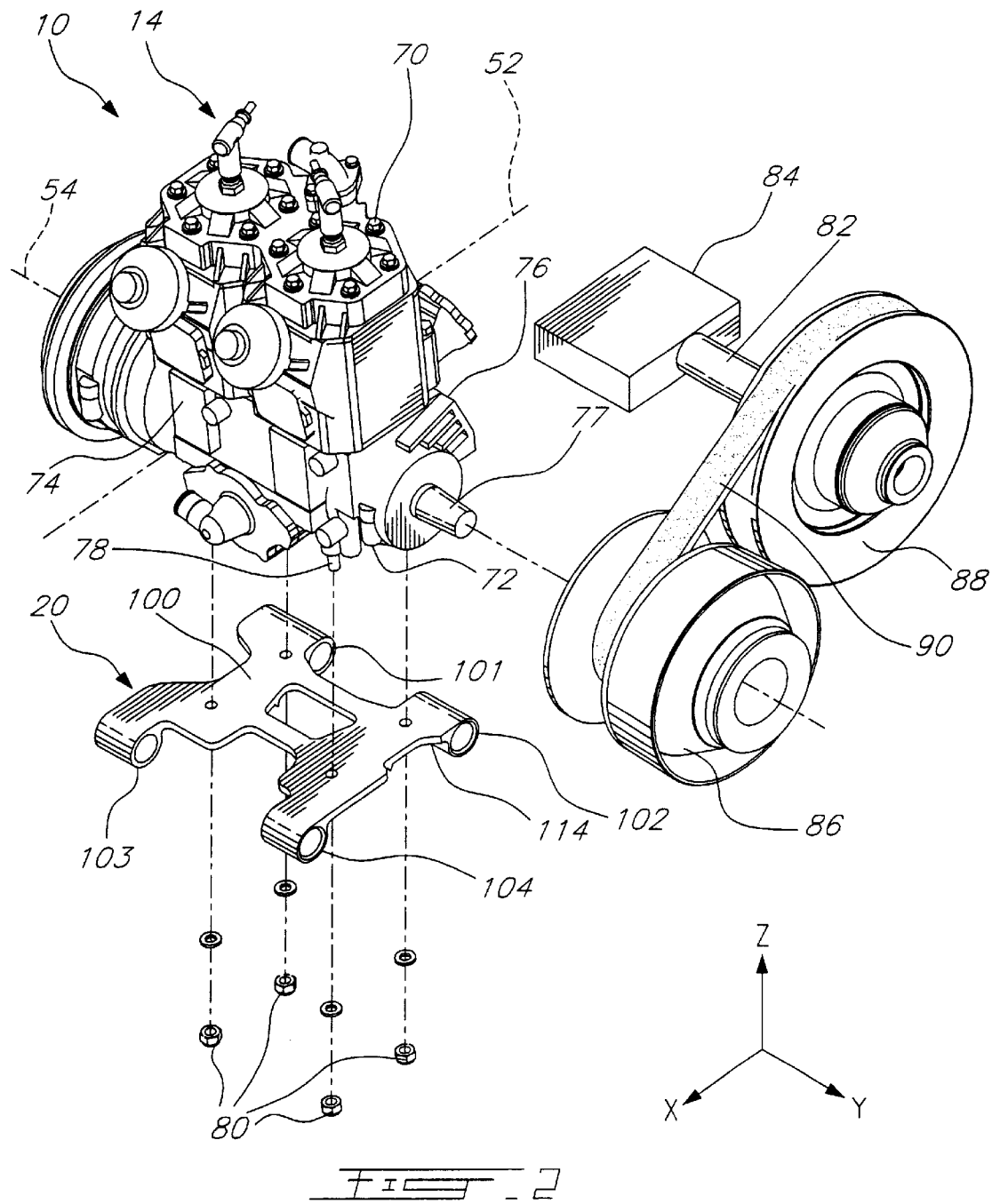
FIG. 2 illustrates a front/left/top exploded, perspective view of the engine mount and engine of FIG. 1.
Figure 3:
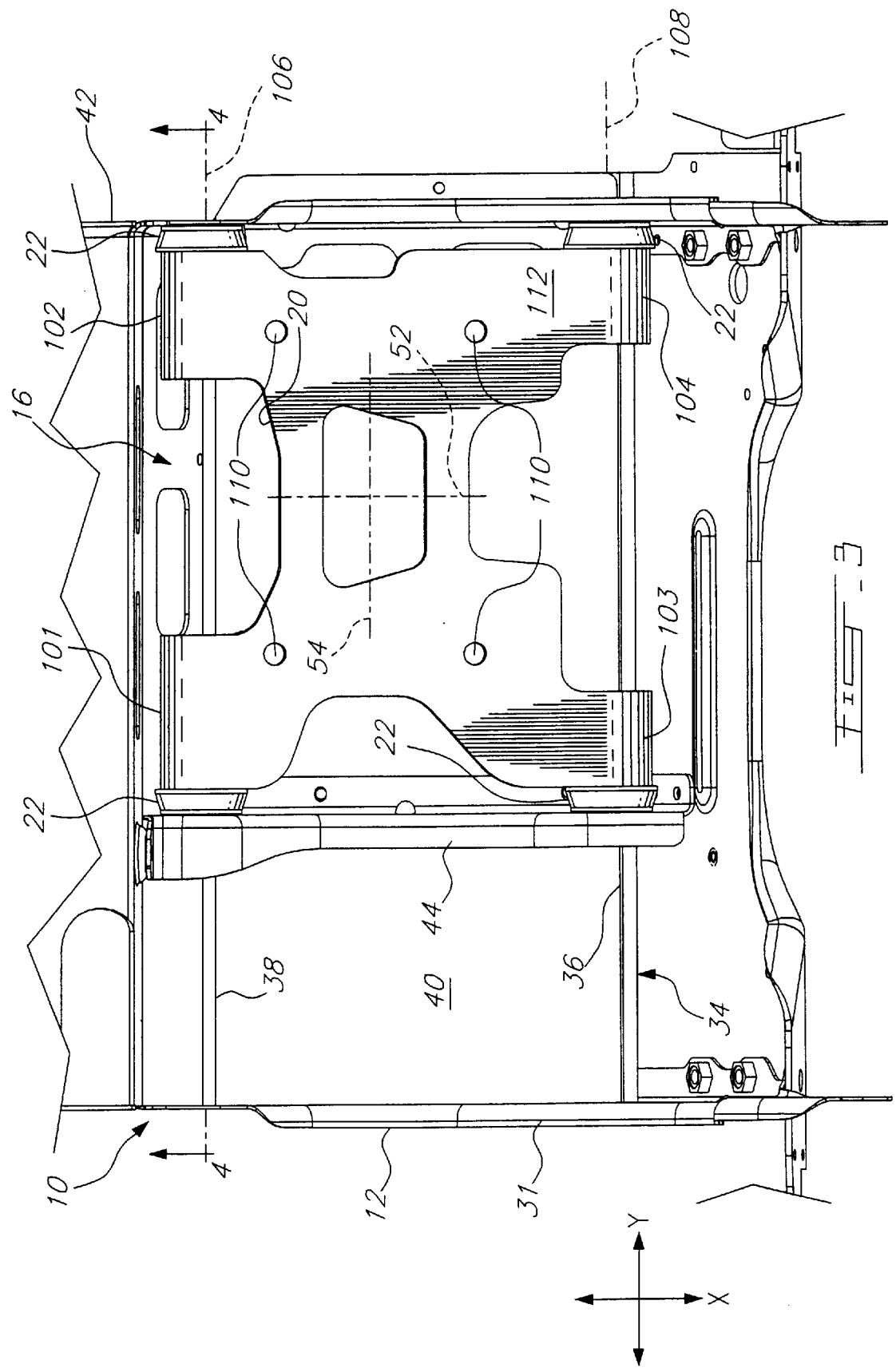
FIG. 3 illustrates a top view of the engine mount of FIG. 1 secured to the chassis.

As seen in FIGS. 1–4, a portion of a vehicle 10, such as a snowmobile, is illustrated, including a section of a chassis 12, an engine 14, and an engine mount 16 coupling the engine 14 to the chassis 12. The engine mount 16 both secures the engine 14 to the chassis 12 and damps vibration generated by the engine 14. The goal is to have the amount of vibration transferred from the engine 14 to the chassis 12 reduced to acceptable levels. The engine mount can include a base plate 20 and damping mounts 22.

Although engine mount 16 is described herein with respect to a snowmobile, it should be understood that engine mount 16 can be used with other vehicles where engines are mounted, as well as with non-vehicle equipment having an engine. Also, although engine mount 16 is described as supporting an engine, the engine mount 16 can be used to support other devices other than engines, especially if there exists a need to reduce vibration between the supported part and another part connected thereto.

As seen in FIGS. 5–8, the snowmobile chassis 12 can include a tunnel 30 and an engine cradle 34. The chassis also can include a pyramid-shaped upper support structure or "superframe" 32 positioned on top of the tunnel 30 and the engine cradle 34. The tunnel 30, engine cradle 34, and superframe 32 are described in more detail in U.S. Patent Application No. 60/230,432. The forward portion 31 of the chassis can include the engine cradle 34, into which engine 14 can be positioned and supported. The chassis 12 can have a longitudinal (X-) axis 52 oriented to extend in the direction of forward and rearward travel of the snowmobile 10 and a transverse (Y-) axis 54 oriented to extend substantially perpendicularly to the longitudinal axis 52 and transverse to the direction of forward and rearward travel of the snowmobile 10.

The engine cradle 34 or apron can be of any appropriate construction and can include an inclined-front wall 36, an inclined rear wall 38, and a floor 40 extending between front and rear walls 36 and 38. The engine cradle 34 can be enclosed on the left side by exterior support wall 42 and on the right side by interior support wall 44. Exterior support wall 42 can form part of the exterior side of the chassis and can include reinforcing panels for increased strength, if necessary. Interior support wall 44 can extend within engine cradle 34 and between and rigidly attached to inclined front and rear walls 36 and 38, respectively. Exterior support wall 42 can have front and rear holes 46 and 47, respectively, extending therethrough. Likewise, interior support wall 44 can have front and rear holes 48 and 49, respectively, extending therethrough. Holes 4649 can receive fasteners, such as bolts 160, that extend through the support walls 42 and 44 and into the engine mount 16 for attaching the engine mount 16 to the chassis 12.

Engine 14 can be any of a variety of engine types. For example, engine 14 can be a two-stroke engine, such as those used for powering some snowmobiles or it can be a larger, more powerful engine for other vehicles. The illustrated engine 14 has a top 70, a bottom 72, a front 74, a rear 76, and a crankshaft 77. Engine 14 can also have fasteners 78 extending down from the bottom 72 for attachment with the engine mount 16, as discussed below. For example, fasteners 78 can be threaded bolts or similar fasteners that protrude from the bottom of the engine 14, pass through the engine mount 16, and are fastened to the base plate 20 by securing fasteners, such as threaded nuts 80. Of course, the engine 14 can be adapted to receive fasteners as a female part rather than as a male part, as illustrated, or other forms of fasteners can also be used.

Engine 14, for example, can be oriented along the transverse axis 54. That is, the crankshaft 77 can be substantially parallel to the transverse axis 54. The crankshaft 77 can be coupled to the driven shaft 82 that drives the track 84 beneath the chassis 12, as described in the commonly assigned applications mentioned above, which are incorporated by reference, along with the commonly assigned U.S. Patent Application No. 60/236,739 for IN-LINE FOUR STROKE SNOWMOBILES, filed Oct. 2, 2000, the contents of which are herein incorporated by reference. The connection between crankshaft 77 and driven shaft 82 can, for example, be made by a driving pulley 86, a transmission, and a driven pulley 88 by a belt 90. The belt can be oriented substantially parallel to the longitudinal axis 52.

Figure 10:
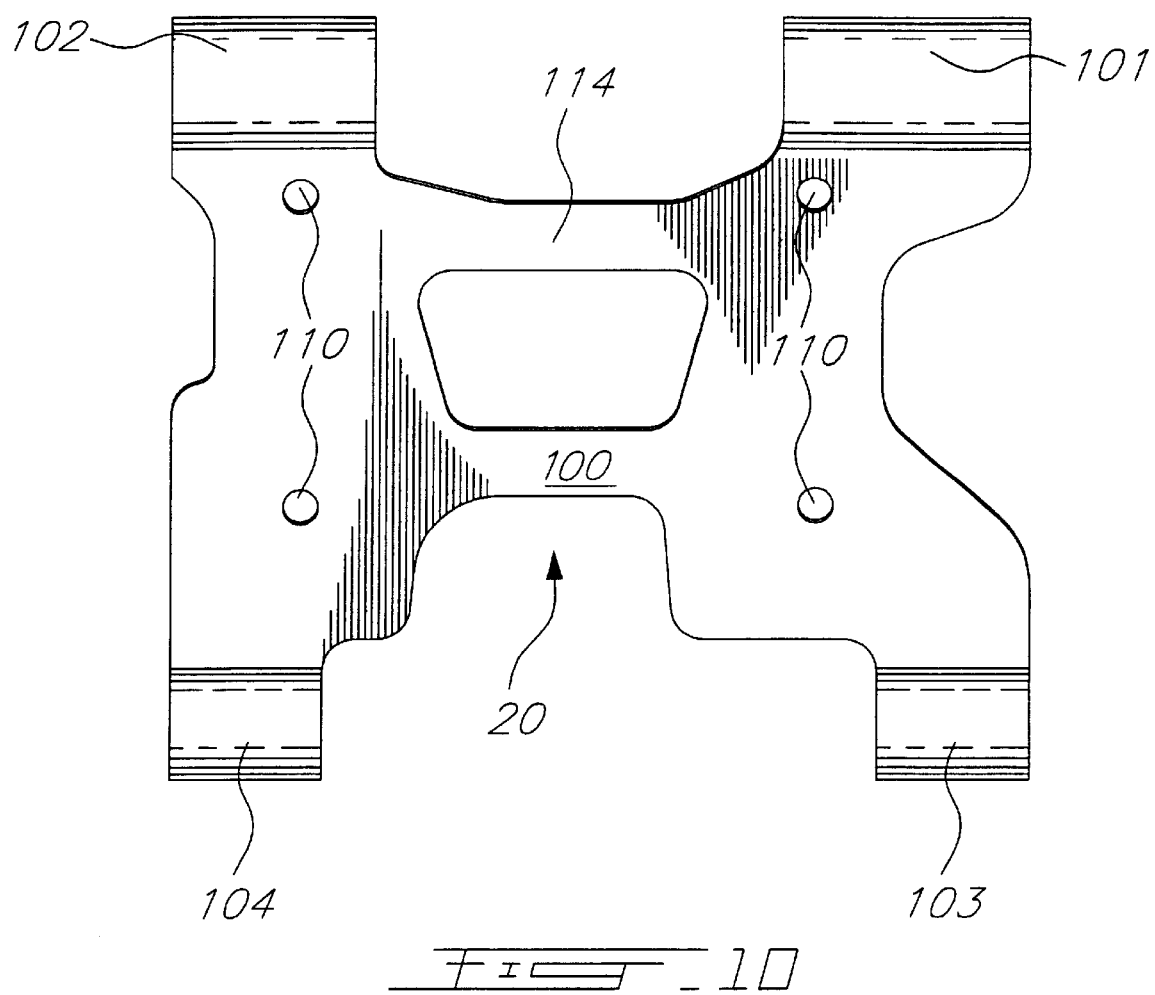
FIG. 10 shows a bottom view of the engine mount of FIG. 1.
Figure 10A:
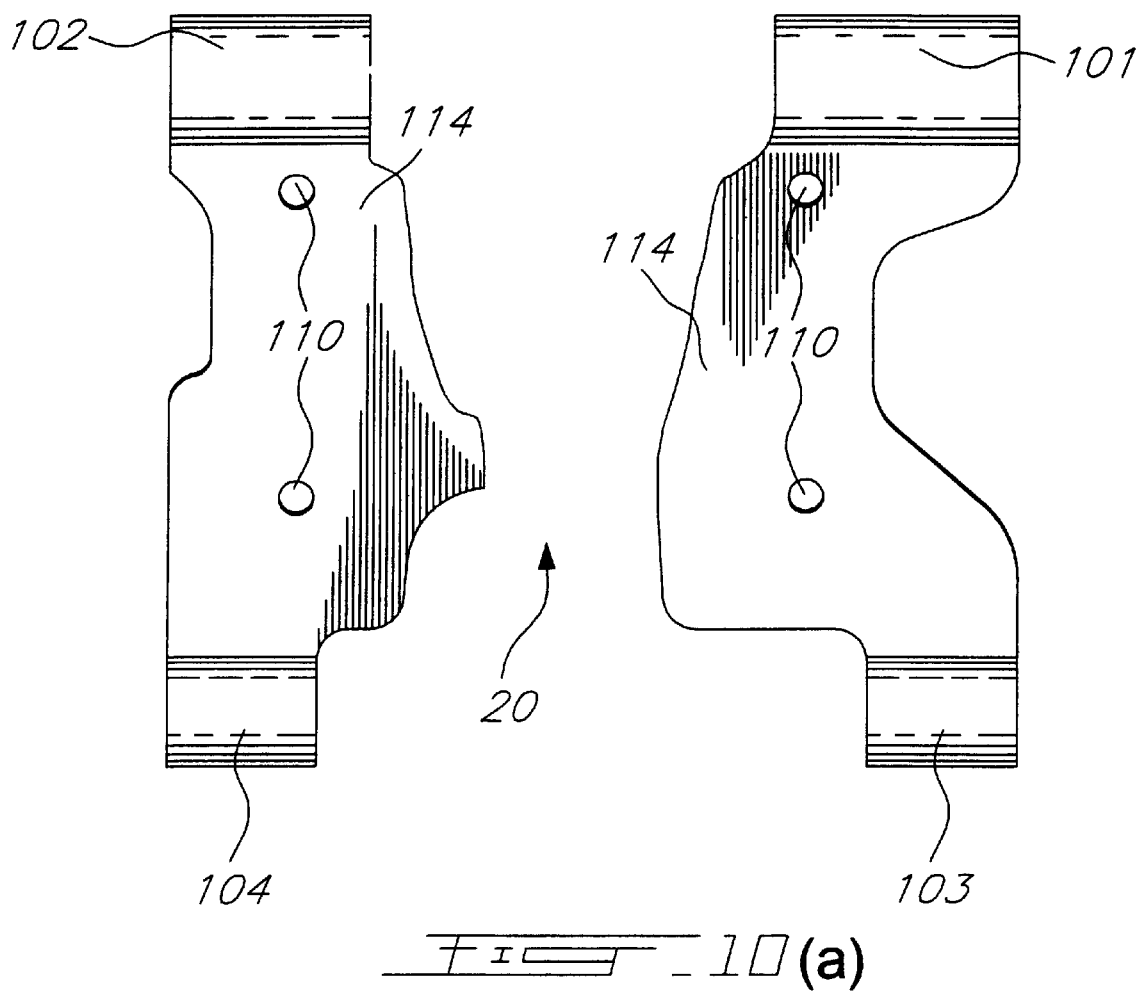
FIG. 10(a) shows a bottom view of the engine mount of FIG. 9(a)
Figure 11:
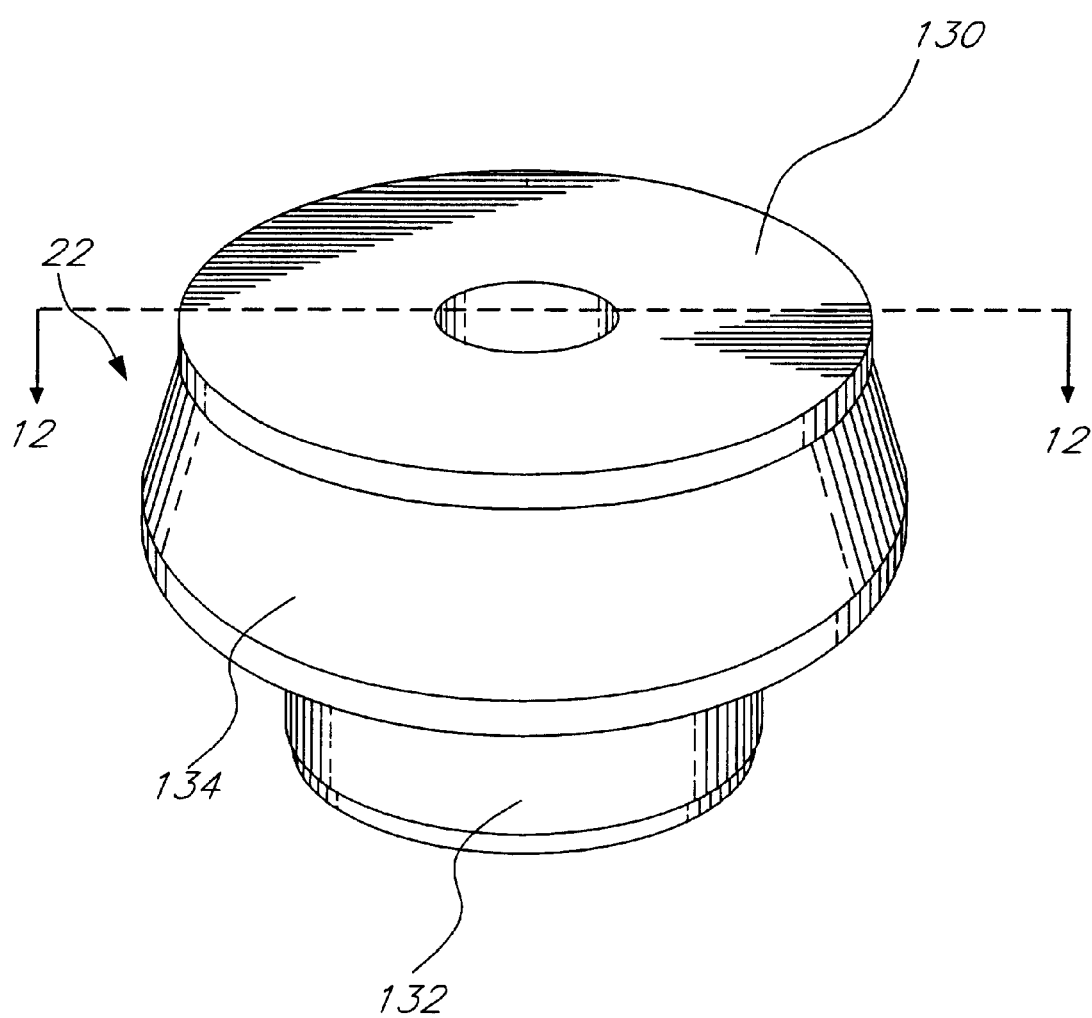
FIG. 11 shows a rubber mount in accordance with an embodiment of the present invention.

As seen in FIGS. 14, 9 and 10, base plate 20 has a middle or body portion 100, having a top 112 and a bottom 114, that has four hollow portions 101, 102, 103 and 104 provided at the corners-of the middle 100. As shown in FIGS. 1–4, 9 and 10 the hollow portions 101, 102, 103 and 104 are cylinders. It should be appreciated, however, that the hollow portions may be formed in other shapes, such as polygonal or combinations of linear and curvilinear sides. The hollow portions 101, 102, 103 and 104 are formed as cylinders as the engine mount is extruded in a preferred embodiment and the cylindrical shape is more easily extruded than, for example, polygonal shapes. It should also be appreciated that hollow portions 101 and 102 may be formed as a single hollow portion and hollow portions 103 and 104 may be formed as a single hollow portion. The preferred embodiment of the present invention provides two sets of coaxial hollow portions 101, 102 and 103, 104 to eliminate the material between the hollow portions and reduce weight.

Cylinders 101 and 102 have a common axis 106 that is substantially parallel to the transverse axis 54. Cylinders 103 and 104 can have a common axis 108 that is likewise substantially parallel to the transverse axis 54 but spaced from axis 106 and on the opposite side of transverse axis 54 from axis 106. Base plate 20 can be and preferably is a unitary, one-piece integrally formed element made from any appropriate material. For example, base plate 20 can be formed from aluminum, steel, reinforced plastic material, other manmade materials, other metals, or combinations thereof. Also, base plate 20 can be formed from a plurality of structural elements that are appropriately connected, such as by welding. The engine mount 16 can made from various materials and processes including an aluminum extrusion forming a unitary element or welded from multiple parts made from other metals, including, for example, steel.

The middle portion 100 can be shaped to conform to the bottom design of engine 14 and can take any shape that permits the top surface of base plate 20 to adequately attach to the element being supported, such as engine 14 or another element such as an intermediate member between engine 14 and base plate 20. The attachment between base plate 20 and engine 14 can take a variety of forms, including threaded bolt depending from below the engine 14. Bolts 78 can extend through associated openings 110 provided in base plate 20. Openings 110 have been sized to permit fasteners 78 to extend completely therethrough and be secured by nuts on the bottom side 114 of base plate 100. Other fastening techniques, including bolts passing upwardly through base plate 20 and into threaded holes in the engine block, could also be used.

As would be known to one skilled in the art, hollow portions 101, 102, 103 and 104 could be separated such as shown in FIG.' 9(*a*). FIG. 9(*a*) illustrates hollow portions 101 and 103 attached to a separate middle portion 113 and hollow portions 102 and 104 attached to another middle portion 115. It would be appreciated also that hollow portion 101 and 102 could be placed on a separate middle portion than 103 and 104 as well as having all four hollow portions 101,102,103 and 104 each individually separated with it own separate base portion.

As best seen in FIGS. 1 and 11–15, each damping mount 22 can include a threaded socket 130, a shoulder washer 132, and a resilient member 134 positioned therebetween. Although the mounting and connection arrangement of each cylinder 101–104 does not necessarily have to be identical to the other, base plate 20 is described herein as having four substantially identical damping mounts, with one damping mount 22 attached to each cylinder 101–104. Consequently, only one will be described in detail.

Figure 4:
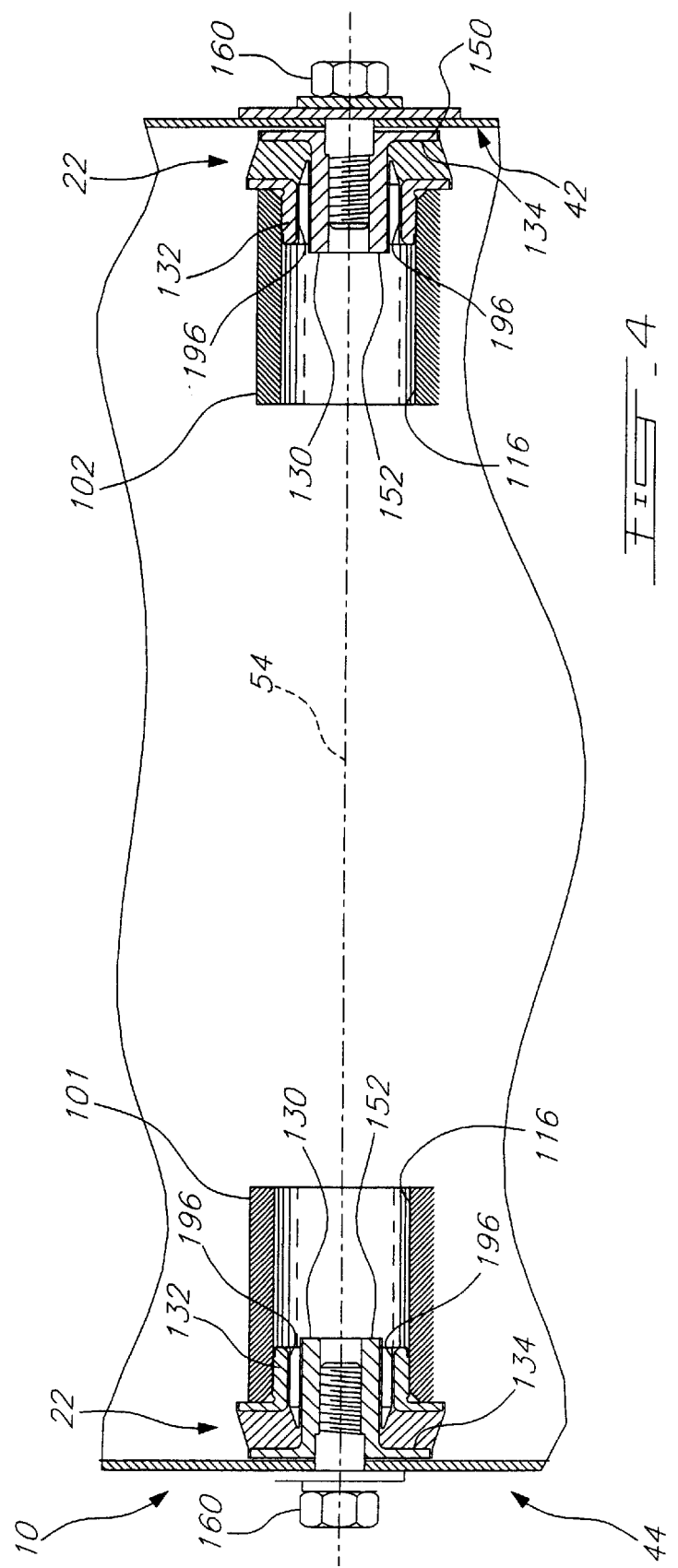
FIG. 4 is a cross-section view of the engine mount and the chassis taken along line 4—4 in FIG. 3.
Figure 5:
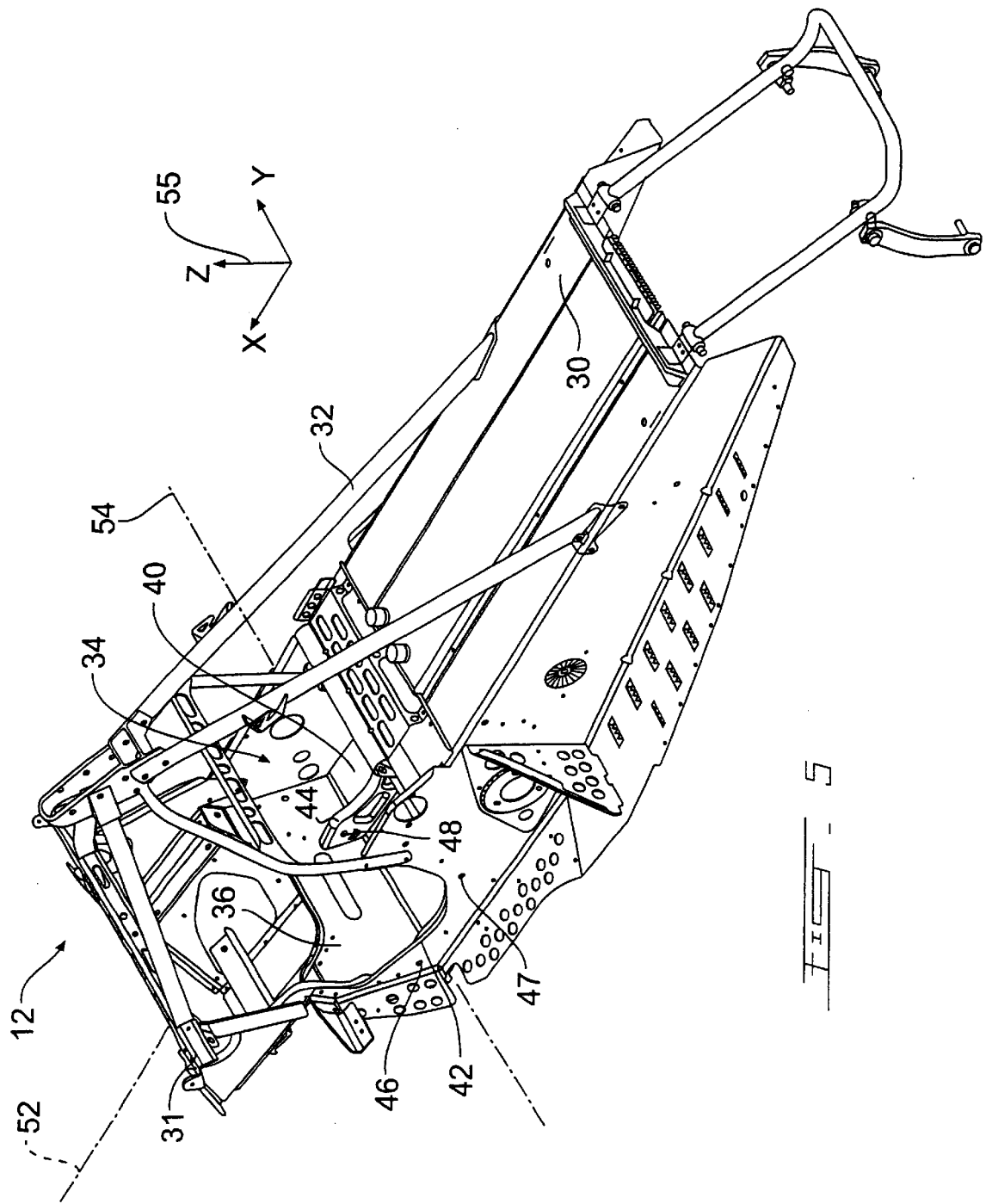
FIG. 5 illustrates a left side, top, rear perspective view of the chassis of the snowmobile of FIGS. 1–4.
Figure 6:
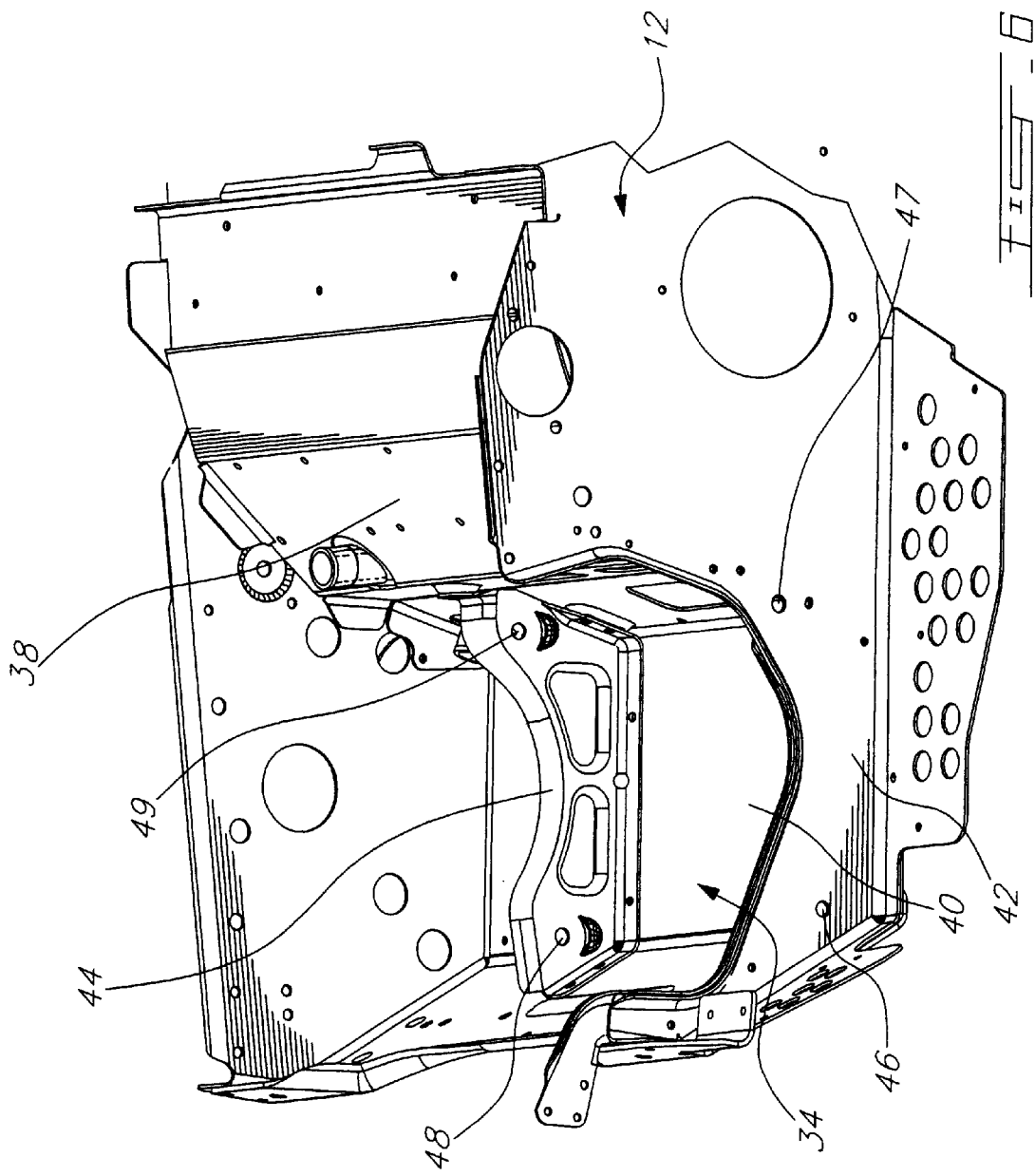
FIG. 6 shows the exterior of the left and interior of the right side of the chassis of FIG. 5 and its engine receiving area.
Figure 7:
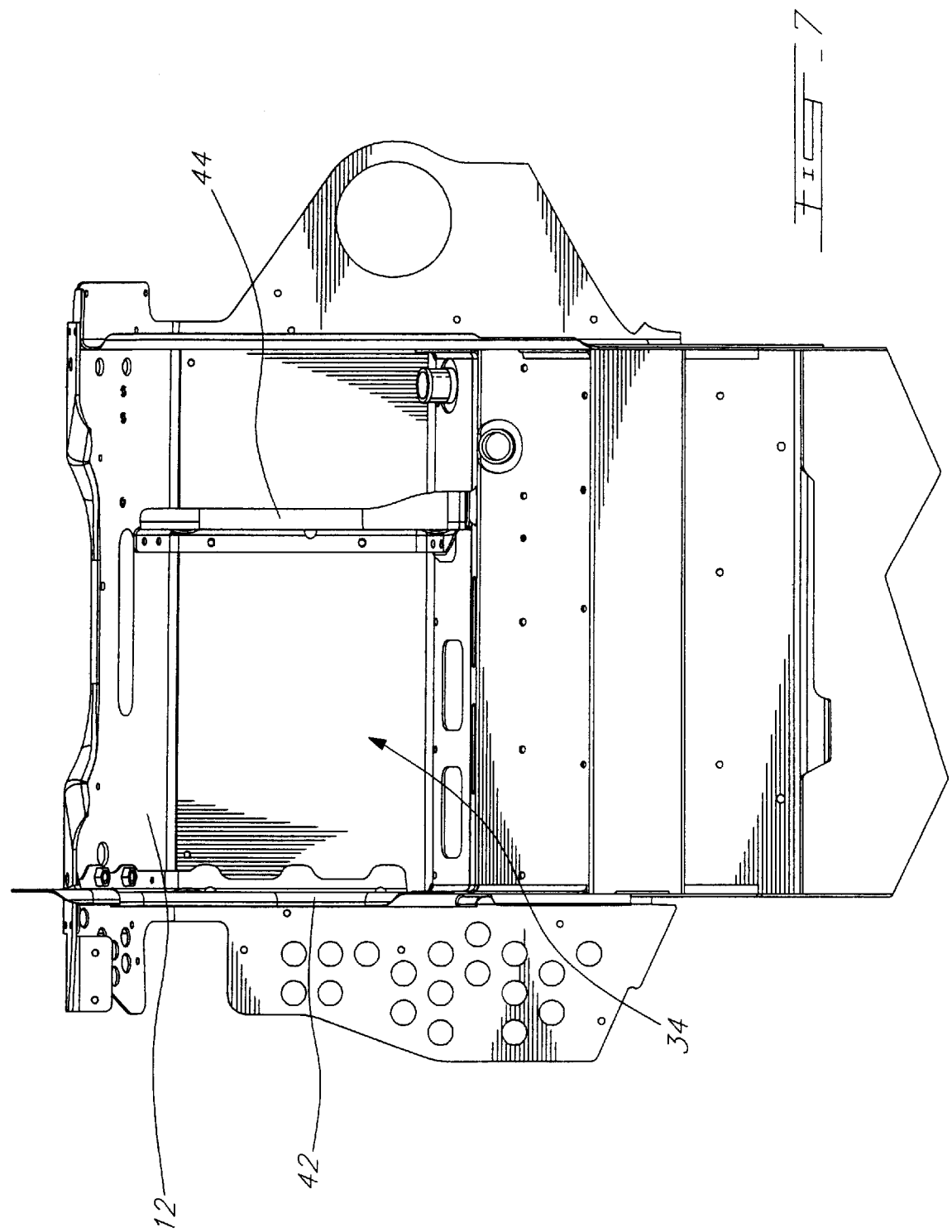
FIG. 7 shows a front, top view of the chassis of FIG. 5 and its engine receiving area.
Figure 8:
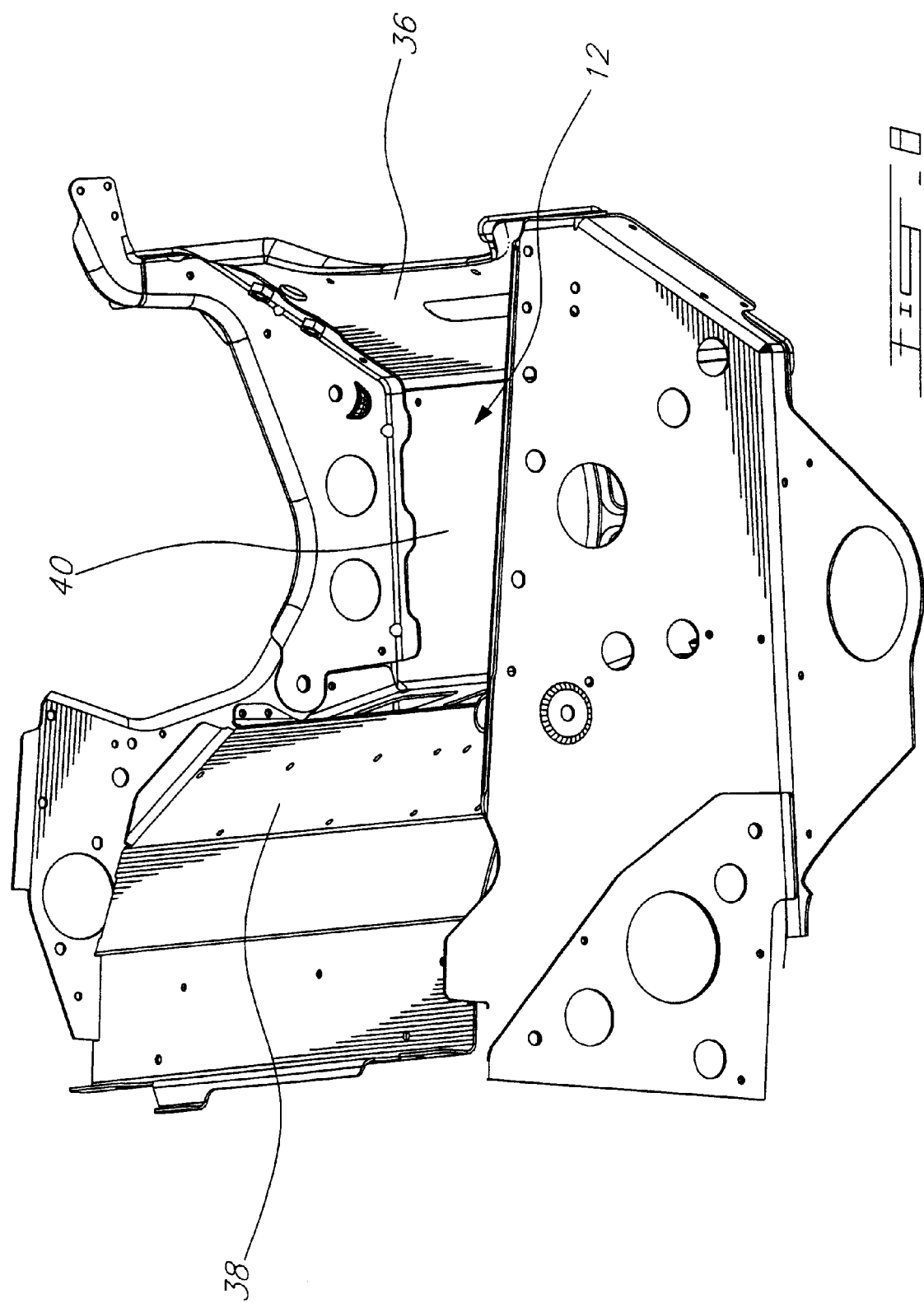
FIG. 8 shows the interior of the left side of the chassis of FIG. 5 and its engine receiving area.

Threaded socket 130 has a flange 150 and an axial extension 152 that are construction as an integral, single element. Of course, socket 130 can be formed from multiple elements. Socket 130 can be formed from metallic material such as steel, aluminum, reinforced plastic material, other manmade materials, other metals, or combinations thereof. Flange 150 is preferably annular and has a substantial front surface area 154 that, in use, faces the adjacent support wall 42 or 44. The surface area 154 can be knurled on the face that contacts the adjacent support wall 42 or 44 to prohibit rotation when attached. The axial extension 152 can be substantially cylindrical with a threaded inner surface 156 capable of being mated with a threaded fastener 160, as shown in FIG. 4, for securing the damping mount 22 to the chassis 12. The extension 152 also can be sufficiently long and narrow to extend within shoulder washer 132.

Shoulder washer 132 has a flange 170 and an extension 172 and they are preferably made as a single element. Of course, shoulder washer 132 can be formed from multiple elements. Washer 132 can be formed of metallic material such as steel, aluminum, reinforced plastic material, other manmade materials, other metals, or combinations thereof. Flange 170 is preferably annular and shaped to fit against an end of one cylinder 101–104 and can be substantially parallel to flange 150. Extension 172 can be substantially cylindrical with an inner surface 173 that has a larger diameter that the outer diameter of extension 152. The outer surface can have an annular shoulder 174 for mating with one of the inner surfaces 116 of cylinders 101–104. The shoulder 174 can have an annular surface and be sized to be press fit within any of cylinders 101–104. The shoulder 174 engages the inner surface 116 in a press fitting relationship to prevent the shoulder washer 132 from rotating relative to and moving axially relative to the cylinder (hollow portion) in which the shoulder washer 132 is inserted. The shoulder 174 may also have a knurled surface to increase the resistance of the shoulder washer 132 to rotation and axial movement.

Resilient member 134 can be formed of rubber or other resilient material capable of appropriately damping vibrations emanating from engine 14 and transmitted via plate 20. The resilient member 134 can extend between and is preferably attached to flanges 150 and 170. However, it is only essential that there be a firm or snug fit between threaded socket 130, shoulder washer 132, and resilient member 134. The amount of material and the type of material forming member 134 can be selected to achieve desired damping characteristics. For example, the member 134 can have a main section 190 located between flanges 150 and 170, an inner section 192, lying adjacent the exterior surface of extension 152 and an outer section 194 lying adjacent the inner surface of extension 172. A gap or hollow space 196 is defined between sections 192 and 194 and can be open to the atmosphere in the direction away from flanges 150 and 170. Gap 196 is preferably left open to the atmosphere, but could be filled with an resilient material, if doing so satisfied particular damping requirements of the resilient member 134. This gap 196 can permit additional, less-damped movement in all directions except along the transverse axis 54. For example, the gap can have a width 197 on each side of extension 152 corresponding to the desired permitted movement of the engine 14 along the longitudinal axis 52. This width 197 may be any dimension but can be in the range of approximately 1.80 mm to 3.50 mm, or preferably about 2.10 mm. Thus, such a width 197 would permit a range of movement of the cylinders 101–104 relative to the damping mount 22 in the direction of the longitudinal axis 52 of the snowmobile or in any direction in the X-Z plane. The thickness and structural features of the resilient member 134 will determine how much of the vibrations will be damped. The resilient member 134 can be bonded to both parts and it can be assembled as one part on the assembly line. One range of the hardness of a rubber resilient member 134 can be between 60–80 shore A durometer. An example of the rubber material that can be used within resilient member 134 is black polyurethane, ASTM D2000 M2BG, G21, EF21, F17, Z1, Z2, Z3 or ASTM D2000 M2AA, 817, A13, B33, F17.

Each cylinder 101–104 has two ends where the damping mounts 22 can be placed. The damping mounts 22 can then be sandwiched between one of the cylinders exterior end and the exterior chassis wall 42 or the interior support wall 44. A fastener such as a bolt 160 is then passed through the support wall 42 or 44 of the chassis 12 and then screwed into the threaded extension 152 of its respective damping mount 22. Thus, the illustrated embodiment will use four bolts 160.

The illustrated embodiment of the invention facilitates the mounting of the engine 14 onto the chassis 12 during production in that on the assembly line, workers are standing on each side of the snowmobile 10. If the workers had to attach the engine mount 16 to the chassis 12 from above the engine mount 16, it would be cumbersome. With the illustrated engine mount 16, the bolts 160 used to fasten the engine mount 16 to the chassis 12 are inserted laterally, substantially parallel to the transverse axis 54 making it an easy task to install the engine 14 with the engine mount 16 attached thereto. The engine mount 16 can be assembled to the bottom of the engine 14 in a sub-assembly production line.

Ideally with engine mount 16, 100% of the vibrations can be absorbed and at the same time, have a non-adjustable engine mount 16 that would keep the pulleys 86 and 88 in perfect alignment. In other words, in order to achieve the best alignment of the engine 14 with respect to the chassis 12, a rigid attachment between the engine 14 and the chassis 12 is desired. One important aspect of the alignment of the engine 14 is the life of the drive belt 90. The life of the drive belt 90 can be effected by the alignment of the engine 14 with respect to the chassis 12. If the engine 14 moves laterally, that is, along the transverse (Y-) axis 54, or rotates around the height (Z-) axis, then the transmission that can be attached to the engine 14 and the driven pulley 88, which may be fixed the chassis 12, will become misaligned. Such misalignment may reduce the belt life.

To obtain a certain comfort level for the driver and maintain the best alignment between the driving pulley 86 and the driven pulley 88, engine 14 must be equipped with dampers that achieve both good vibration damping yet also maintain good alignment. The engine base plate 20 and damping mounts 22 cooperate to ensure that desired amounts of vibration from the engine can be absorbed and at the same time suitably limit the movement of the engine 14 and maintain the desired amount of alignment of engine 14.

The one damping mount 22 can be placed at each end of the cylinders 101–104 so that any movement of the engine along the longitudinal (X-) axis 52, the height (Z-) axis, or in the X-Z plane, places the resilient member 134 in a shear force situation. Such longitudinal (X-) axis, Z-axis 55, or X-Z plane movement of the engine 14 along the longitudinal axis 52 is not as significant a concern since the pulleys 86 and 88 will adjust to this change and such movement will not affect the life of the belt 90 as movement along the transverse axis 54. Any lateral movement along the transverse (Y-) axis 54 or rotation around the Z-axis 55 will result in the resilient members 134 undergoing compression or tension. The alignment of the pulleys 86, 88 is very important in considering the life of the belt 90 and the life depends mainly on the lateral movement along the transverse axis 54 and rotation around the Z-axis 55. Also, those movements of the engine 14 can correspond to the same movement of the transmission and the pulley 86. When the engine 14 experiences such movement, it is advantageous to have resilient members 134 in compression since compression offers much more support than when the resilient members 134 are in a shear situation. In the conventional engine mounts, the rubber was partially in shear when the engine was subjected to a lateral force.

The thickness of the resilient member 134 along the transverse axis 54, between flanges 150 and 170 and thus the damping ability of the member 134 can be determined through testing. An acceptable thickness of resilient member 134 between flanges 150 and 170 can be between 8 mm and 12 mm. However, any acceptable thickness range is dependent on amount of vibration to be damped. The resilient material 134 can be bonded to the socket 130 and the washer 132 wherever it is in contact with the mating parts 130 and 132. Such bonding enables the resilient material in member 134 to work in shear as well as in tension. The axis of the damping mount 22 and its elements will be in the lateral (y-axis) direction, parallel to the transverse axis 54 of the engine 14. Therefore, any movement of the engine 14 along the transverse (Y-) axis 54 would put the resilient material of the member 134 in compression or tension on the opposite direction. Any movement in the X-Z plane, upward or downward movement along the height (Z-) axis or forward or rearward movement along the longitudinal axis 52 will place the resilient member 134 in shear since it is bonded to the socket 130 and the washer 132.

One aspect of the damping mount 22 is the amount of movement it will allow in the X-Z plane through the use of gap 196. The movement allowed between the shoulder washer 132 and the threaded socket 130 by gap 196 can be very small, for example, approximately 2.10 mm. This can provide enough movement to absorb the vibration of the engine 14 itself but not enough to let any outside forces, such as hard bumps from the trail, move the engine 14 more than desired. Vibration from the engine 14 could sufficiently be damped with a thickness of the resilient member 134 as determined, as through testing. Any movement between the shoulder washer 132 and the threaded socket 130 of more than the desired amount, for example, 2.20 mm will place those two parts 132, 130 in contact and then limit additional movement.

Another advantage of the damping mount 22 is the size of the mating surface area that exists between the surface 154 of flange 150 and the sidewall 42 of the chassis 12. With the large flange 150 on the end of the threaded socket 130, a large contact area is formed between the damping mount 22 and the side wall 42 of the chassis 12 to form a more secure and rigid connection between the parts over a large surface area. For example, the flange 150 can have an outermost diameter of approximately 36–38 mm.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein.

What is claimed is:

1. A method of assembling a vehicle, including
   providing a chassis having a longitudinal axis, a transverse axis, a top, a bottom, and a side;
   providing an engine;
   providing a base plate including a first attaching portion;
   fastening the engine to the base plate;
   positioning the engine and the base plate within an upwardly opening recess in the chassis; and
   inserting a fastener through the side of the chassis and into the first attaching portion of the base plate in a direction that is substantially parallel to the transverse axis.

2. A method according to claim 1, wherein securing of the engine to the base plate occurs prior to the positioning of the engine within the upwardly opening recess in the chassis.

3. A method according to claim 2, wherein the step of inserting a fastener through the side of the chassis and into the first attaching portion of the base plate in a direction that is substantially parallel to the transverse axis further comprises inserting a resilient mounting element within the first attaching portion.

4. A method according to claim 3, wherein movement of the engine parallel to the transverse axis places the resilient member in compression.

* * * * *